(12) United States Patent
Wood et al.

(10) Patent No.: US 9,049,289 B1
(45) Date of Patent: Jun. 2, 2015

(54) REMOTE TELEPHONY SERVICE MANAGEMENT

(75) Inventors: Patrick Wood, Raleigh, NC (US); John Gilmore, Cary, NC (US)

(73) Assignee: RPX Clearinghouse LLP, Dover, DE (US)

(*) Notice: Subject to any disclaimer, the term of this patent is extended or adjusted under 35 U.S.C. 154(b) by 1353 days.

(21) Appl. No.: 10/970,975

(22) Filed: Oct. 22, 2004

(51) Int. Cl.
*H04M 3/42* (2006.01)
*H04M 7/00* (2006.01)

(52) U.S. Cl.
CPC .......... *H04M 3/4217* (2013.01); *H04M 7/0024* (2013.01)

(58) Field of Classification Search
USPC .............. 379/201.12, 114.05, 201.03, 210.02
See application file for complete search history.

(56) References Cited

U.S. PATENT DOCUMENTS

| | | | |
|---|---|---|---|
| 4,797,910 A | | 1/1989 | Daudelin |
| 5,325,421 A | | 6/1994 | Hou et al. |
| 5,483,586 A | | 1/1996 | Sussman |
| 5,652,789 A | | 7/1997 | Miner et al. |
| 5,724,412 A | | 3/1998 | Srinivasan |
| 5,742,668 A | * | 4/1998 | Pepe et al. .................... 455/415 |
| 5,850,433 A | | 12/1998 | Rondeau |
| 5,884,262 A | | 3/1999 | Wise et al. |
| 5,915,001 A | | 6/1999 | Uppaluru |
| 5,915,008 A | * | 6/1999 | Dulman ................... 379/221.08 |
| 5,978,806 A | | 11/1999 | Lund |
| 6,014,634 A | | 1/2000 | Scroggie et al. |
| 6,031,836 A | | 2/2000 | Haserodt |
| 6,038,296 A | | 3/2000 | Brunson et al. |
| 6,065,016 A | | 5/2000 | Stuntebeck et al. |
| 6,069,890 A | | 5/2000 | White et al. |
| 6,097,793 A | | 8/2000 | Jandel |
| 6,125,113 A | | 9/2000 | Farris et al. |
| 6,243,451 B1 | * | 6/2001 | Shah et al. ............... 379/201.03 |
| 6,256,771 B1 | | 7/2001 | O'Neil et al. |
| 6,631,186 B1 | | 10/2003 | Adams et al. |
| 6,714,641 B2 | | 3/2004 | Kredo et al. |
| 6,853,715 B2 | * | 2/2005 | Flanagan ................. 379/201.12 |
| 6,961,417 B2 | | 11/2005 | Koch |
| 2004/0204844 A1 | * | 10/2004 | Xu ............................... 701/209 |

* cited by examiner

*Primary Examiner* — Amal Zenati
(74) *Attorney, Agent, or Firm* — Withrow & Terranova, PLLC

(57) ABSTRACT

The present invention provides a system and method enabling telephony service subscribers to activate, deactivate, make service changes, and access call-related information from telephony services provided by a telephony service provider. According to one aspect, the service management system of the present invention interacts with subscriber terminals connected to a public data network. The service management system receives requests from subscriber terminals and converts the requests into a format compatible with terminal emulation programs, such as the Telnet protocol, running on end office switches. Using the converted request information, the requested service changes are made or the requested call-related information is collected by the end office switches with little or no intervention by service provider personnel.

17 Claims, 4 Drawing Sheets

REMOTE TELEPHONY SERVICE MANAGEMENT

FIELD OF THE INVENTION

The present invention relates to telecommunications services, and in particular to providing devices and methods enabling telecommunication service subscribers to access and control telecommunications services.

BACKGROUND OF THE INVENTION

Telephony networks have evolved dramatically over the past several decades thanks to an array of new technologies. These new technologies have, among other things, allowed service providers to create and introduce new telephony services into their networks, and, once introduced, customize the services to meet the needs of individual customers (also called "service subscribers" or simply "subscribers" in this specification). Service providers are constantly seeking to develop and commercialize these new services to satisfy customer desires and increase revenue.

One such enabling technology is the intelligent telephony network (or "intelligent network") which takes "intelligence" out of the telephony voice switch and places it in computer nodes that are distributed throughout the telephone network. The intelligent network architecture in its basic form is a traditional telephony voice network overlaid with a packet-data network used to more efficiently control and monitor the voice network. In intelligent networks, the signals required to set up, monitor, and take down calls in the circuit-switched, time division multiplexed ("TDM") voice network (the "service logic" signals) are implemented in the more efficient packet-data network which is external to the voice circuit switching systems.

The Advanced Intelligent Network (or "AIN") architecture expands the potential of early intelligent networks and provides greater flexibility in creation and customization of telephony services for customers. Among other features, the AIN includes a set of standards governing intelligence in public networks which allow equipment manufacturers and service providers to design and develop custom services on various non-switch platforms that can interact with various telephony network nodes.

Specifications of the various releases of AIN specifications may be found in Bellcore AIN GR1299 Issue 6 and later editions, Bellcore AIN GR1298 Issue 6 and later editions, and related Bellcore standards (hereinafter "AIN Architecture Standards"). Bellcore was renamed Telcordia Technologies in 1999 and, therefore, the cited specifications and later editions may bear that name. The disclosures of the AIN Architecture Standards are incorporated by reference herein in their entirety. Those skilled in the art will recognize other call signaling and control technologies compatible with the concepts of the present invention are comparable to the AIN and will be considered within the scope of the description and claims of the invention that follow.

One of the major benefits of the advanced intelligent network was the creation of open interfaces which allowed service providers to introduce network services more rapidly for customer use. The AIN also allows for the separation of service specific functions and data from other network resources. Through use of these open interfaces and data exchange, service development and implementation was greatly accelerated.

Many of these telephony services provided to customers are currently implemented on end office switches ("EO switches," also called "end exchanges"). An end office is a type of central office that connects directly to customers and is where customer lines and trunks are interconnected. Customer telephony services may also be implemented in private branch exchanges ("PBXs") operated as part of enterprise telephony networks. Throughout this specification, a reference to an EO switch shall be understood to mean a switch that provides services to customers, subscribers, or end-users, of telecommunication services and shall include all switches implementing telephony services for customers that are capable of directly or indirectly interacting with an intelligent network. The EO switch may take on many different configurations but in most cases will at least provide voice-based communications in a circuit-switched, packet-switched, or wireless infrastructure. Nortel Networks' DMS-100 system is an example of an EO switch. Those of ordinary skill in the art will realize that other telephony network switches from Nortel Networks and other manufacturers, including those not located in a telephone service provider's "central office" or "end-office" may perform similar or comparable functions to the DMS-100 system, and are equivalent.

Although there has been a proliferation of telephony services, telephony service subscribers have had limited ability to control these services and the call-related information associated with the services. For example, in some cases, a service subscriber must call their service provider and directly request the desired change or information. This option is obviously both expensive and time consuming. Often, a service subscriber must navigate lengthy audio call menus and wait on hold in queue before ever talking to a service provider representative. When the service subscriber finally speaks to a representative, the service subscriber may not have all the information readily available that is needed to make informed decisions about the service change. The communication between the subscriber and representative may, therefore, be unnecessarily long. Furthermore, the representative must then take additional time to make the changes to the services via an interface with the service control system. Alternatively, the representative might be required to submit a service request to have yet another service provider employee make the necessary changes, thereby adding another layer of delay and cost.

Another option typically available to service subscribers is to use a telephone keypad to make changes to services using dual-tone multi-frequency (DTMF) signaling from the subscriber's telephone. In this, perhaps, slightly better method, a service subscriber can make more timely changes without involving a service representative. Unfortunately, to use this method, the subscriber must often decipher a long string of numerical or symbol codes to change service options and wade through lengthy, complicated call menus. In addition, the subscriber may only be able to make changes to certain already provisioned services using this method and may not be able to activate or deactivate services. Further, this method is subject to potential mistakes from dialing chains of DTMF codes.

Some telephony service providers also allow subscribers to request activation or deactivation of services using internet-based input from the subscriber. For example, a service provider may allow subscribers to access a page the service provider hosts on the World Wide Web. The customer's desired changes are typically recorded by the web-based program and transmitted to the service provider employees that are responsible for customer service provisioning. The responsible service provider employees must then take the information and make the requested changes. This additional step significantly increases the cost of the transaction for the service provider and may significantly delay implementation of the subscriber's preferences. In addition, such current "web-based" provisioning solutions may only allow a subscriber to request activation and deactivation of services. It does not allow management of the services such as changing different attributes of a particular service. For example, a subscriber can only request activation or deactivation of a speed dial service, but cannot enter a list of desired numbers for the speed dial service.

A number of telephony services also collect and maintain call-related information. Unfortunately, many subscribers do not have real-time access to such information. Some of the call-related information stored on the EO switch cannot be accessed by subscribers at all. For example, the EO switch may collect and maintain a list of the calls attempted, calls completed, and calls made to a particular subscriber line. Many subscribers with analog "plain old telephone service" ("POTS") lines and legacy telephone equipment may not be able to access the information stored by the call log service at all. Other subscribers may only be able to access the information if a telephony service provider has set up an interactive voice response ("IVR") system that essentially "reads" call log information to subscribers over their telephone. Subscribers who have purchased telephone equipment using special protocols, such as the Analog Display Services Interface ("ADSI") protocol, may be able to retrieve and view call log information using the small screen format of their special equipment, but only when the equipment terminates the line for which the service is provisioned.

In light of these limitations, there is a need to provide telephony service subscribers with easier access to information about available services and to enable subscribers to activate available services, manage services, and deactivate undesired services (collectively, "service management") with minimal or no intervention by the service provider. In addition, there is an identified need for subscribers to dynamically manage their telecommunications services irrespective of their geographic location. Furthermore, there is a need for service subscribers to access, from different devices and locations, telephony service control and call-related information collected by various telephony services.

There is also an identified need for a subscriber to dynamically manage telecommunications services without having to listen to audio prompts or otherwise access or memorize code lists required to manage services using DTMF manipulation. There is a further need for a relatively simple interface that provides subscribers with information about available services and allows subscribers to control telecommunications services minimizing potential mistakes resulting from dialing chains of DTMF codes.

SUMMARY OF THE INVENTION

The present invention provides systems and methods for controlling telephony services with little or no direct intervention by service provider personnel. The present invention also provides systems and methods which provide telephony service subscribers with greater access to call-related information associated with their telephony services. Specifically, the telephony service management system ("service management system") of the present invention allows subscribers to use service subscriber terminals ("subscriber terminals") to access the services provided by a service provider and the call-related information that is stored by those services.

According to one aspect of the present invention, both the subscriber terminals and a service provider server are connected to, and communicate through, a public data network such as, for example, the Internet. The service provider server is also disposed to communicate with end office switches using a terminal emulation program, such as the Telnet protocol. The terminal emulation program is also loaded into, and running on, the end office switch providing the services.

According to another aspect, the services management system of the present invention receives requests for service changes or for call-related information stored by various telephony services from any of a number of different types of subscriber terminals. The services management system converts these requests into a format compatible with the terminal emulation program running on the end office switch providing the services. The services management system then transmits the converted request to the end-office switch providing the services. When the services management system receives the confirmation of a requested service change or receives requested information, it converts the received information into a format compatible with the requesting subscriber terminal and transmits information to the requesting subscriber terminal.

According to another aspect of the present invention, the services management system may send a subscriber identification request to a subscriber terminal in order to authenticate service subscriber's identity before enabling subscriber access privileges. The services management system then receives a response to the subscriber identification request including subscriber authentication data. The services management system then validates the subscriber authentication data by comparing received subscriber authentication data with subscriber profiles stored in a database accessible by the services management system. If validation is confirmed, the control system enables subscriber access privileges.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

According to the present invention, a telecommunications services subscriber employs a terminal emulation program, such as the Telnet protocol, to allow a subscriber to communicate, either directly or indirectly, with an EO switch in order to activate services, deactivate services, effect telecommunication service changes, and obtain call-related information collected by the services. This allows subscribers to manage services and obtain call related information with minimal or no intervention by the service providers personnel.

The Telnet protocol is an application layer protocol (Open Systems Integration (OSI) Model Layer 7) that is defined in the IETF Network Working Group ("IETF") Request for Comments ("RFC") 854 (May 1983). Telnet provides terminal emulation over a TCP connection, enabling a subscriber to assume control over the applications that reside on the remote system. As described in greater detail below, by using the Telnet protocol, the subscriber can interact transparently in a client/server relationship either directly or indirectly with the EO switch. The services management system of the present invention is illustrated below with reference to the Telnet protocol in order to illustrate various aspects of the invention and is considered a preferred embodiment of the present invention. However, those skilled in the art will also recognize that other protocols may be implemented to provide terminal emulation in a data communications environment, and that the present invention is not limited by the description in the specification alone to the Telnet protocol.

Figure 1:
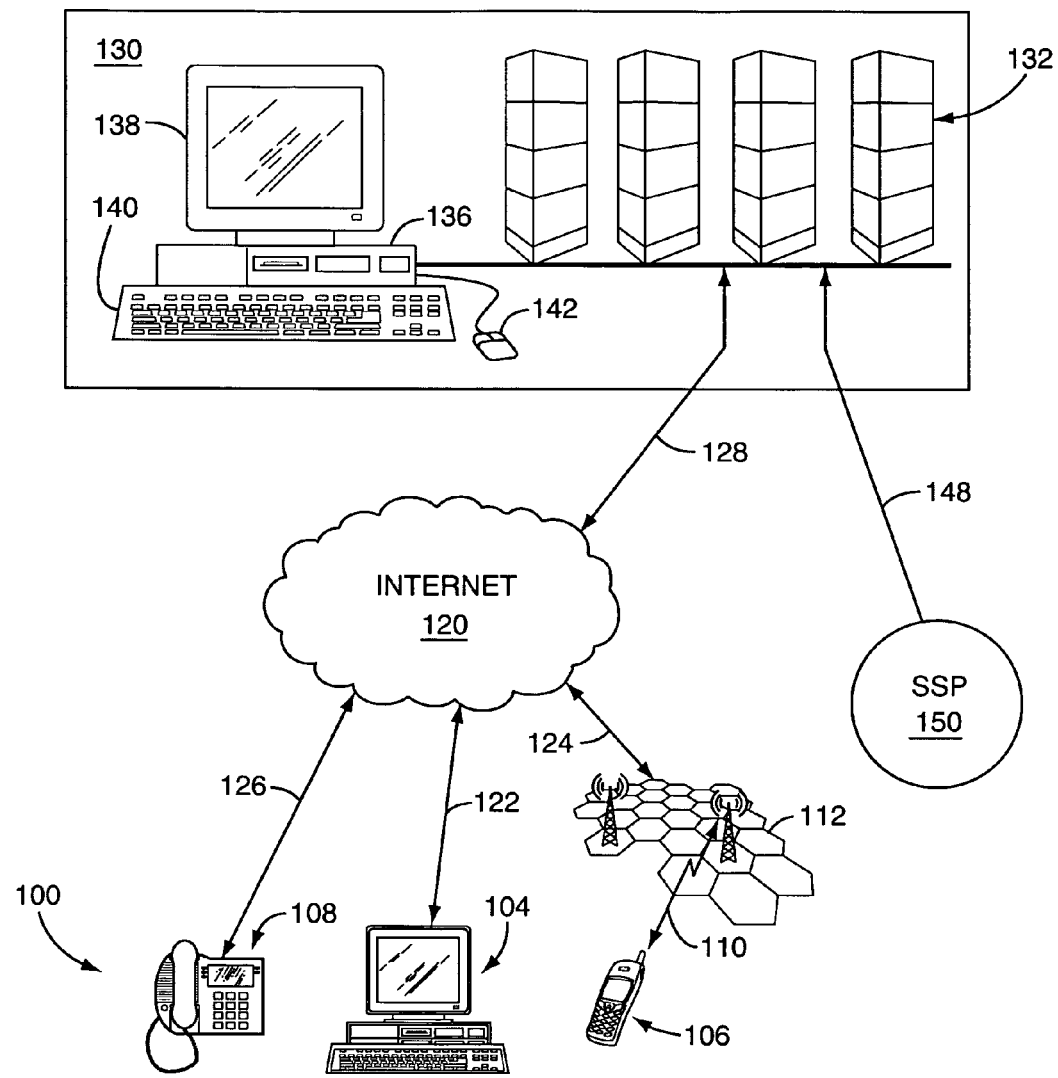
FIG. 1 illustrates a communication environment including aspects of embodiments of the present invention.

FIG. 1 illustrates an embodiment of the telephony services management system of the present invention. Referring to FIG. 1, various subscriber terminals 100 are represented by a personal computer 104 and a web-enabled telephone device 108 that are each connected to a public data network, such as, for example, the Internet 120, over network communications connections 122 and 126, respectively.

Another type of subscriber terminal is represented by mobile handset 106 which is associated with a network communications connection 124 to a wireless network environment 112 providing wireless voice and data access over a common air interface 110 to the mobile handset 106. Although not specifically illustrated, the relationship between the subscriber terminal and the wireless network environment 112 will be understood by those of ordinary skill in the art to include any or all the functionalities associated with the following network elements: a mobile switch ("MSC"), a base station controller ("BSC"), a serving GPRS support node ("SGSN"), a packet data support node ("PDSN"), a gateway GPRS support node ("GGSN"), a radio node controller ("RNC"), a wireless data gateway, and other network elements necessary to implement the present invention.

Although only three examples of subscriber terminals 100 are illustrated, those skilled in the art will recognize that a subscriber terminal may be any device that allows the subscriber to establish a connection to the Internet 120. Web-browsers (e.g., Microsoft Internet Explorer® or Netscape Navigator®) and other related applications typically reside on subscriber terminals to allow the service subscriber to interact with the Internet 120.

As also shown in FIG. 1, the telephony service provider maintains one or more computers that are connected to, and are capable of interacting with, the Internet 120 or similar distributed network that may be accessed by the subscriber terminals. The service provider computers, for example, may comprise a single computer or a multi-server farm of computers. In a preferred embodiment of the present invention, the server computer 130 maintained by the telephony service provider (or "service provider server 130") is connected to the Internet 120 via network communications connection 128. The service provider server 130 is connected to the Internet and is capable of interacting with subscriber terminals using various protocols such as, for example, Transmission Control Protocol/Internet Protocol ("TCP/IP"), Hypertext Transport Protocol ("HTTP"), and File Transfer Protocol ("FTP").

The service provider server 130 comprises a collection of server computers 132 and an interconnected access terminal used to access, communicate with, and control, the interconnected servers 132. The server access terminal may comprise, for example, a computer 136 with a connected display device 138 used for interacting with the computer 136. A keyboard 140, mouse 142, and other devices may also be connected to the computer 136 to provide user input to the computer 136.

Figure 2:
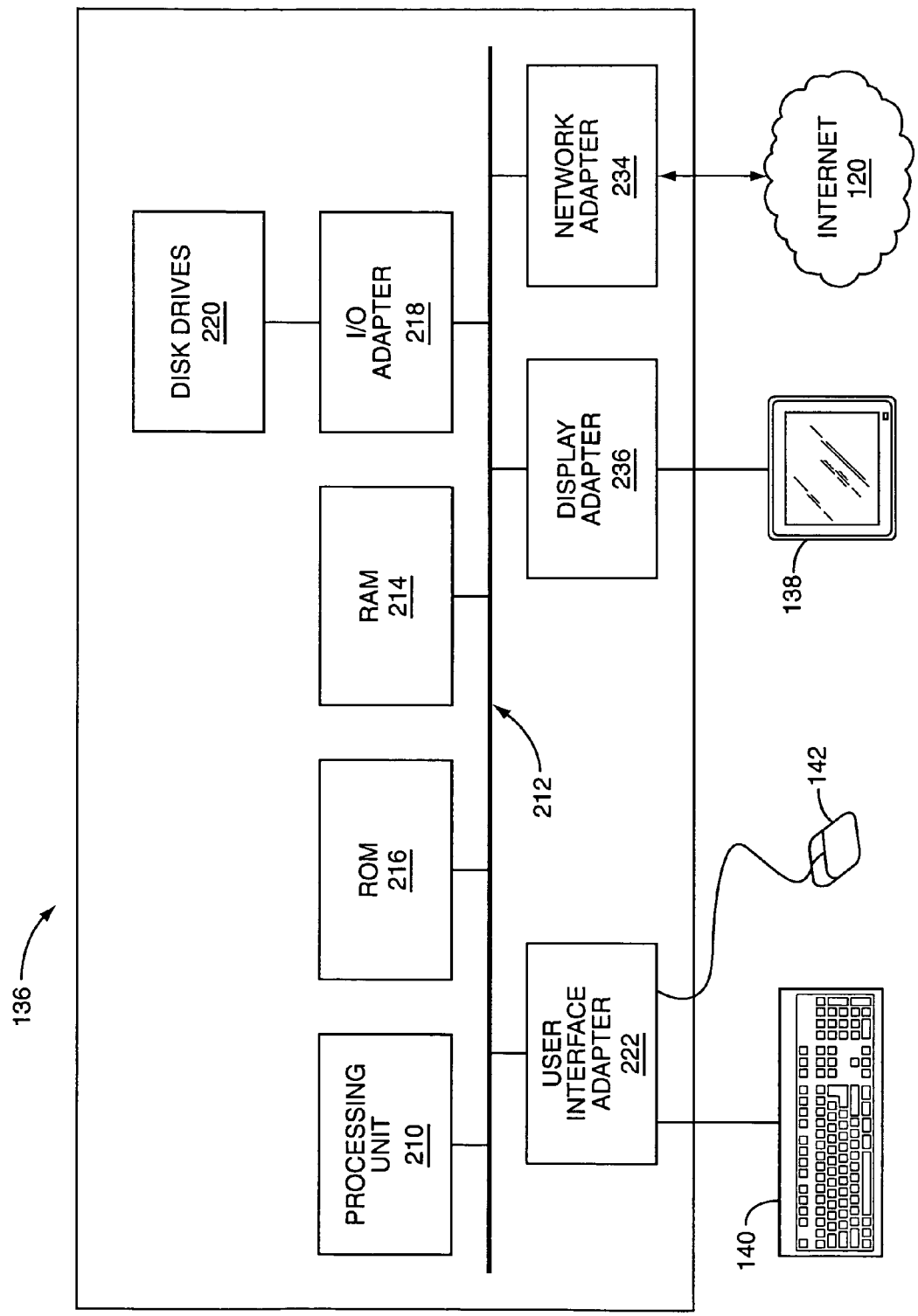
FIG. 2 is a block diagram illustrating aspects of a computer system on which the present invention may operate.

A representative hardware environment for practicing the present invention is depicted in FIG. 2, which illustrates an exemplary hardware configuration for the computer 136. As shown in FIG. 2, the computer 136 includes a processing unit 210, such as a conventional microprocessor, and a number of other units interconnected via system bus 212. The system may include different memory devices, including random access memory (RAM) 214 and read only memory (ROM) 216. Also shown is an input/output (I/O) adapter 218 for connecting peripheral devices such as disk drives 220 to the system bus 212.

Computer 136 also includes a user interface adapter 222 for connecting a keyboard 140, a mouse 142, and/or other user interface devices to the system bus 212. A network adapter 234 is also provided for connecting the system to the Internet 120. A display adapter 236 is also provided for connecting the system bus 212 to display device 138.

The processing unit 210 may include other circuitry not shown herein, which will include circuitry commonly found within a microprocessor, e.g., execution unit, bus interface unit, arithmetic logic unit, etc. The telephony services management system of the present invention is preferably embodied as a software application and executed on computer hardware similar to that illustrated in FIG. 2. In a preferred embodiment of the present invention, the access terminal computer 136 will also include a terminal emulation program such as the Telnet protocol. Although these components of the present invention have been described as separate parts of the access terminal computer 136, those of ordinary skill in the art will realize that the various functionalities may be performed by a combination of server computers, such as servers 132, and access and control computers such as the access terminal computer 136. It should be understood that these various arrangements fall within the scope of the disclosure.

The service management system of the present invention may be implemented in an AIN using standardized signaling protocols such as Common Channel Signal System No. 7 ("SS7") and functional network service elements, each of which is designed to fulfill specific call processing and service deployment functions. The various switching and processing elements of a telecommunication networks are generically referred to herein as "network nodes" or "nodes." Nodes in the telecommunication packet data network that originate and receive signaling messages, or transfer signaling messages from one signaling link ("SL") to another, or both, are generally referred to as signaling points ("SP"). Those skilled in the art will also recognize that numerous protocols may be implemented for communications in a telephony network, including, for example, AIN; Intelligent Network Application Part (INAP); Wireless Intelligent Network (WIN); Customized Applications for Mobile Network Enhanced Logic (CAMEL); Computer Telephony Interface (CTI); Primary Rate Interface (PRI) and ISDN User Part (ISUP).

Figure 3:
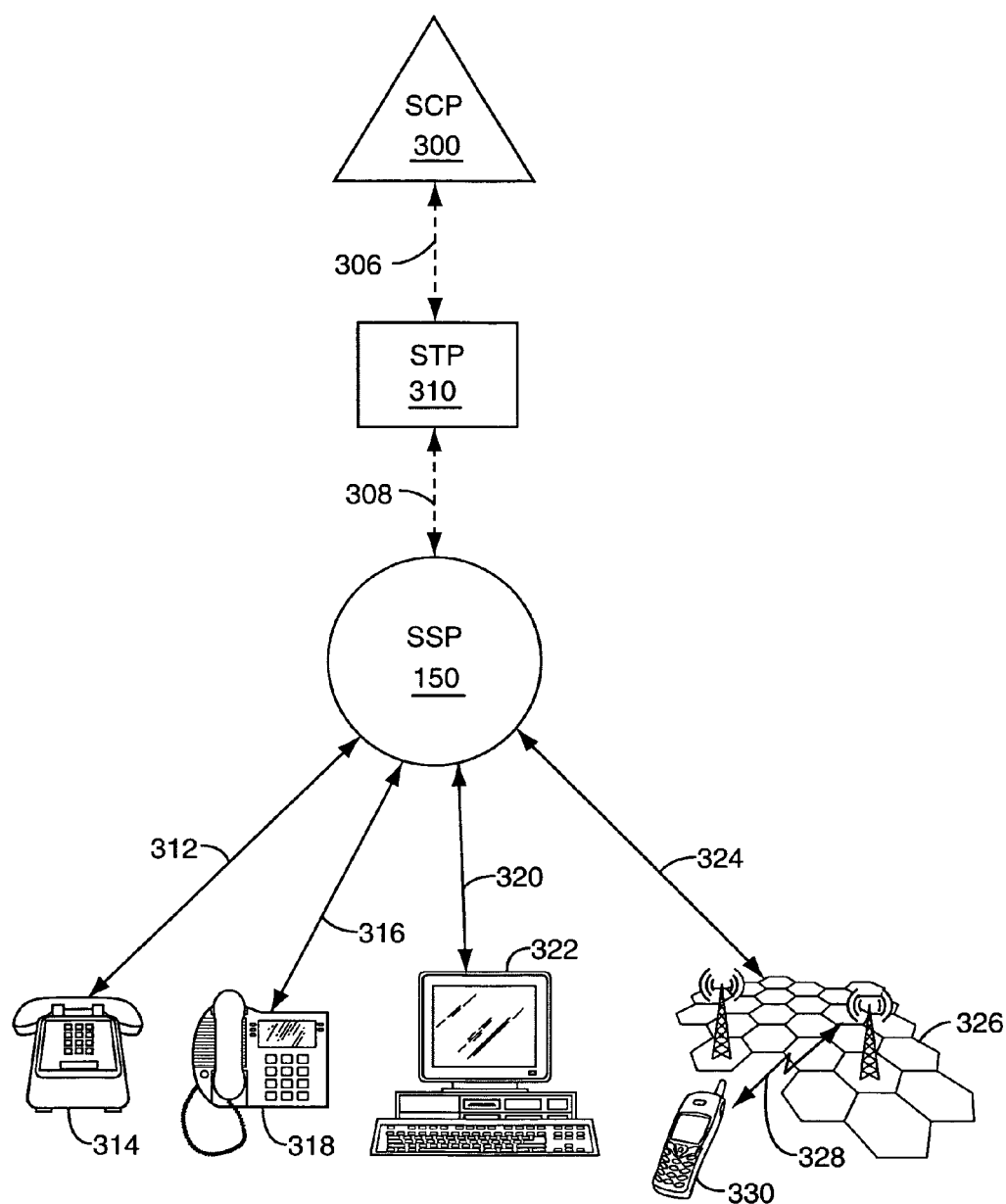
FIG. 3 illustrates a communication environment including aspects of embodiments of the present invention.

The service provider server 130 is, in turn, connected via representative network communications connection 148 to the EO switch represented by service switching point 150 (or "SSP 150"). FIG. 3 further illustrates certain components of the AIN including SSP 150. In FIG. 3, SSP 150 is represented as a service switching point capable of interacting with the AIN using SS7 functionality. SSP 150 is preferably a programmable SP switch capable of recognizing AIN-type calls, launching queries to other network nodes, and receiving commands and data from other network nodes to further process and route AIN-type calls. Those of ordinary skill in the art will understand that many types of EO switches are signaling points that communicate directly with the AIN, whereas others rely on other intermediate equipment to facilitate communication with the AIN. Such architectures are considered equivalent for purposes of the present invention as long as communication with the EO switch is enabled. Those skilled in the art will recognize other call signaling and control technologies compatible with the concepts of the present invention.

Connected to SSP 150 are various telecommunication devices that may be associated with service subscribers. For example, SSP 150 may provide various service connections to service subscribers including, for example: analog POTS service through an analog connection 312 to a standard analog telephone 314; integrated services digital network service ("ISDN") over ISDN connection 316 to an ISDN terminal 318; and a digital fiber subscriber line service over fiber (or hybrid-fiber) connection 320 to a general purpose computer 322. Those of ordinary skill in the art will recognize that various intermediate network elements and connections may be used to connect subscribers to SSP 150.

SSP 150 may also include a network connection 324 to a wireless network environment 326 that provides wireless voice and data access over a common air interface 328 to a representative mobile handset 330. The wireless network environment 326 may be similar to the wireless network environment 112 described in greater detail above. Those of ordinary skill in the art will also recognize that wireless network environment 112 may be the same wireless network environment represented by wireless network environment 326 for some applications even though the two wireless network environments are represented here as separate entities.

Not shown in FIG. 3 are many elements of the AIN connecting SSPs that allow transport of call traffic over local and inter-exchange carriers. Such features are described in the above-referenced AIN Architecture Standards.

Service logic in the AIN may reside in a service control point (SCP) 300 and associated SCP database (not shown). SCP 300 is an off-board processor that includes service logic, and related systems and information, which provision and administer services for completing voice calls and administering other telephony services. SCP 300 typically comprises an integrated system which may include a service management system (SMS) (not shown), a data and reports system (DRS) (not shown) for compiling call information to be used for billing and administrative purposes, and a service creation environment (SCE) (not shown). The SCE may comprise, for example, a programming environment for creating and provisioning services for subscribers.

One or more signal transfer points (STP) 310 may also be disposed in the AIN to route signals efficiently between network signaling points (e.g., SSPs, SCPs and other STPs). For example, STP 310 may connect SCP 300 and SSP 150 over SL 306 and 308. STP 310 is typically interconnected with other STPs (not shown) by a number of signaling links to increase the efficiency of the networks and provide redundant signaling paths.

Referring again to FIG. 1, in a preferred embodiment of the present invention, a subscriber will access the Internet 120 on any compatible subscriber device and navigate to a web-site hosted by the service provider server 130. Generally, any form of network access connection may be adapted for implementing the instant invention including, but not limited to, dial-up modem access, cable modem access, xDSL access, ISDN access. For example, a general purpose computer 104 may access the Internet 120 across access connection 122 which may be any of the above-referenced connection types. The web-enabled telephone 106 may, for example, be an ISDN terminal and may access the Internet 120 using ISDN Internet access connection. The mobile handset 106 may access the Internet 120 across common air interface 110 to mobile network 112 which in turn provides a wireless access connection.

The service provider server 130 is connected via a packet data network to various network nodes that may implement subscriber services and store information related to those subscriber services. For example, server 130 may communicate with SSP 150 over data network connection 148. Server 130 communicates with the various nodes using protocols implemented on the PSTN.

Figure 4:
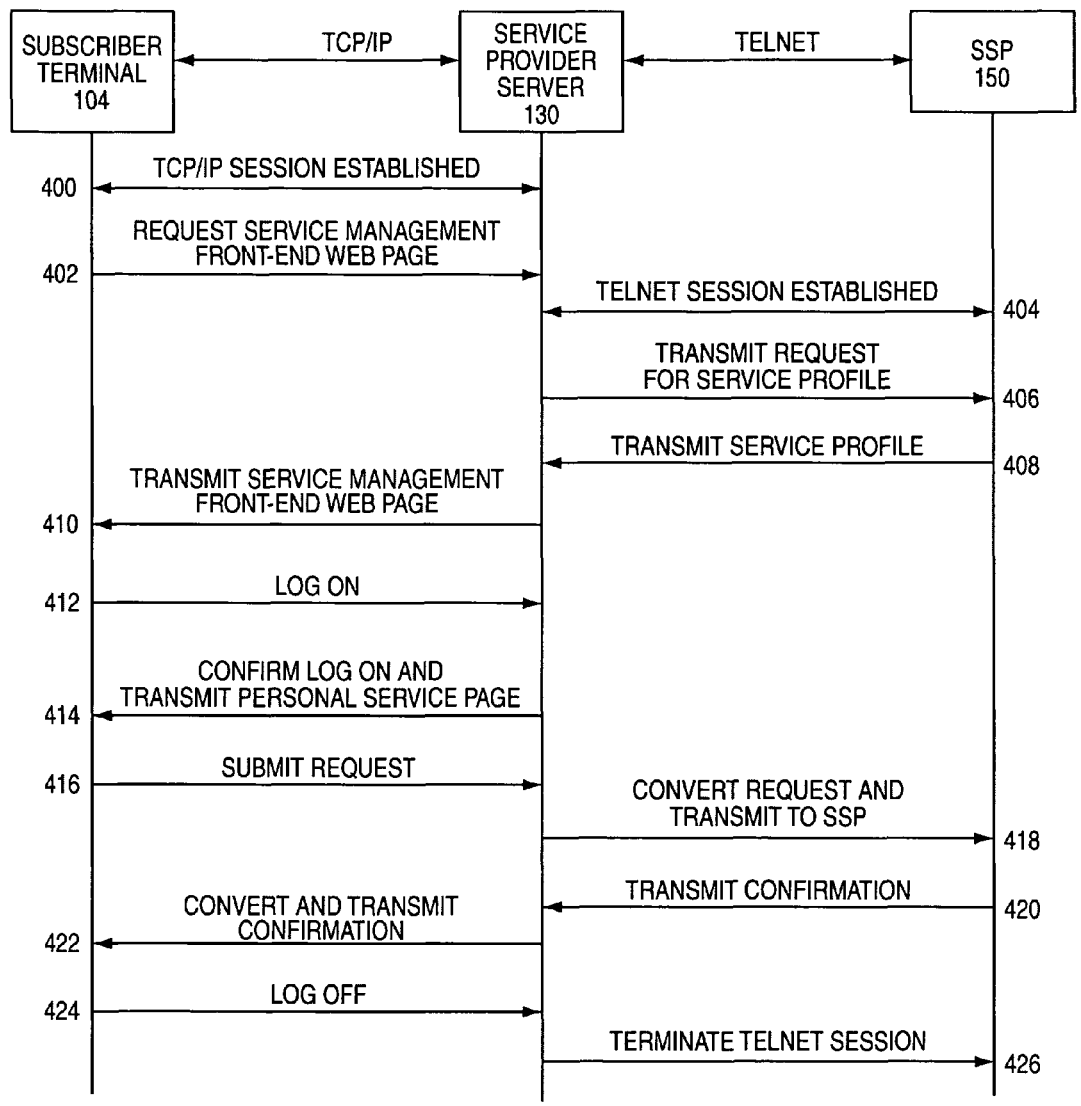
FIG. 4 is a communications flow diagram illustrating aspects of call flow of an embodiment of the present invention.

FIG. 4 is a communications flow diagram illustrating aspects of call flow between the elements illustrated in FIGS. 1 and 3 and illustrates the operation of a preferred embodiment of the present invention. With reference to FIGS. 1 and 4, as shown in FIG. 1, a telephony service subscriber at a subscriber terminal, e.g., general purpose computer 104, accesses the Internet 120 over internet access connection 122. Using a web-browser residing on the subscriber terminal, the subscriber terminal establishes a communications session with server 130 (step 400) using, for example, the TCP/IP protocol.

The subscriber requests an HTTP-compatible web page located on server 130 that is provided by the telephony service provider to enable service subscribers to manage telephony services (step 402). Typically, the initial web page requested by the service subscriber will be a "front-end" web page that may include certain information about services available to the subscriber. The service information is preferably obtained from a service profile stored on an EO switch, e.g., SSP 150. Therefore, a Telnet session is established with the EO switch SSP 150 to obtain the service profile information (step 404).

Service profiles typically include information such as current services available to subscribers, activation status of services, and relevant attributes of services. In a preferred embodiment of the present invention, subscriber service profiles include subscriber privilege level information including, for example, but not limited to, what services particular subscribers, or groups of subscribers, may access using the present invention. Service profiles are typically stored at EO switches to enable the EO switches to provide subscribers the services to which they have subscribed. In addition, subscriber profiles may be stored at an SCP, e.g., SCP 300, to facilitate service management and billing. In one embodiment of the present invention, copies of subscriber profiles may be stored in a local database associated with server 130 (not shown). If subscriber profiles are maintained at multiple locations, the various copies of the subscriber profiles are periodically reconciled. In a preferred embodiment, the service management system of the present invention obtains, uses, and updates subscriber profiles stored at the EO switch.

Continuing with the example of FIG. 4, the service provider server 130 will transmit a request for the customer service profile from SSP 150 using the existing Telnet session (step 406). In response, the SSP 150 will locate and transmit the requested customer service profile to the service provider server 130 (step 408). Once the service provider server 130 has received the requesting customer's service profile, the server 130 will transmit a service management front-end web page to the requesting service subscriber (step 410).

In a preferred embodiment of the invention, also included as part of the front-end web page, a service provider may require the subscriber to enter authentication information such as an account number and password in order to log on and gain further access to personalized service information. In another embodiment of the invention, a service provider may require the subscriber to enter a private access key obtained from the service provider or from a commercial provider of private access keys used to authenticate identity for web-based services.

For example, after entering data in provided fields of the received front-end web page, the subscriber transmits the entered data that constitutes a Log On message (step 412) to server 130. Server 130 receives and processes the Log On message and, in a preferred embodiment, validates authentication information submitted by the subscriber with information stored in the subscriber's service profile. If the Log On message is verified, the server 130 transmits a message to the customer confirming that the Log On was successful (step 414). The server 130 also converts the retrieved service profile information into a web-page that includes personalized service information and options available to the requesting service subscriber. Server 130 transmits the personalized web-page to the requesting subscriber as part of the Log On confirmation page (step 414) or at any later time when requested by the subscriber. Using the personalized web page, the subscriber is able to determine, for example, what telephony services are available and the current status of available telephony services. In addition, the subscriber may make changes to the subscriber service profile.

In another embodiment of the present invention (not shown), a customer may be required to log on to the SSP 150. In such case, the customer's log on information would be transmitted to the SSP 150 via the Telnet protocol and verified at the SSP 150. For example, if a Log On message is authenticated at the server 130, the server 130 converts the Log On message into, for example, the Telnet protocol for communicating with the SSP 150. Server 130 then transmits the converted message to SSP 150 as a Telnet Log On request. If the Telnet Log On is successful, the SSP 150 sends a return Telnet message indicating that the Log On was successful. For even greater security, a service provider may require a subscriber to log on to both the server 130 and the SSP 150. Those of ordinary skill in the art will recognize other variations of the present security plan that fall within the scope of this specification and the claims that follow.

The services management system of the present invention may perform conversions from web-based information requests to the Telnet protocol by using conversion protocols such as the Simple Object Access Protocol ("SOAP"). SOAP converts programs running in one operating system and allows them to communicate with programs in the same or another operating system by using the World Wide Web's Hypertext Transfer Protocol (HTTP) and Extensible Markup Language (XML) as the mechanisms for information exchange. SOAP specifies how to encode an HTTP header and an XML file so that a program in one computer can call a program in another computer and pass it information. It also specifies how the called program can return a response.

In a preferred embodiment, the web page will present the subscriber with various choices of making service changes and/or retrieving call-related information. For example, the web page may indicate that the call log service is available to the subscriber for one or more directory numbers ("DN") associated with the subscriber. The web page will preferably indicate whether the call log service is currently active. Assuming that the call log service is available for a certain DN, but not active, the subscriber may decide to activate the service. To do so, the subscriber indicates the desired selection by, for example, selecting or deselecting buttons or check boxes on an HTML web page. The subscriber then transmits the HTML form over the Internet 120 to server 130 (step 416).

Server 130 receives the subscriber's request and responds by creating and sending a Telnet message to SSP 150 (step 418). In turn, SSP 150 receives the request and, if possible, performs the request or locates the desired call-related information. SSP 150 then sends a confirmation message to server 130 (Step 420). Upon receipt of the confirmation message, server 130 may send a web page to the requesting subscriber containing some form of confirmation action has been taken (step 422).

After the subscriber has completed the transaction, the subscriber may send a Log Off message to server 130 (Step 424). Once the server 130 receives the Log Off message, the server may terminate the Telnet session with SSP150 if there are no other transactions occurring between server 130 and SSP150 (step 426). In another embodiment (not shown), service providers may also choose to program server 130 to terminate active Telnet sessions after a certain elapsed period of inactivity, thereby providing a "time-out" function to conserve system resources.

While active, a typical call log service may collect and record an array of call-related information at various points-in-call ("PIC") for the directory number for which the service has been activated. For example, a call log may collect and record information for calls attempted from a DN, calls completed from a DN, and calls made to a DN. The information collected at each defined PIC may include, for example, the time of the call, call duration, the directory number of the calling or called part, caller identification information, call routing information, etc. Using the present invention, a subscriber may access information stored in a call log, or may access information stored by similar services, by requesting download of the information to any subscriber terminal. For example, to start the information download, the service subscriber may use the subscriber terminal to make entries on an HTML web page made available by the service provider, thereby indicating the desired information.

It is to be understood that the present invention illustrated herein may be implemented by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, tape, or any similar media. The media can also be a memory storage device or collection of memory storage devices such as read-only memory (ROM) or random access memory (RAM).

Additionally, the computer program code can be transferred to the appropriate hardware over a data network.

The present invention has been described, in part, with reference to flowchart illustration(s) or message diagram(s). It will be understood that each block of the flowchart illustration(s) or message diagram(s), and combinations of blocks in the flowchart illustration(s) or message diagram(s), can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s) or message diagram(s).

These computer program instructions may also be stored in a computer-readable memory that can direct a computer or other programmable data processing apparatus to function in a particular manner such that the instructions stored in the computer-readable memory provide a service, product or article of manufacture, including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustration(s) or message diagram(s) support combinations of means for performing the specified functions, combinations of steps for performing the specified functions and program instruction means for performing the specified functions. It will also be understood that each block of flowchart illustration(s) or message diagram(s), and combinations of blocks in flowchart illustration(s), or message diagram(s) can be implemented by special purpose hardware-based computer systems that perform the specified functions or steps, or combinations of special purpose hardware and computer instructions.

Those skilled in the art will also recognize improvements and modifications to the preferred embodiments of the present invention. All such improvements and modifications are considered within the scope of the concepts disclosed herein and the claims that follow.

What is claimed is:

1. A method of controlling telephony services in an end office switch serving a plurality of service subscribers, comprising:
   a) receiving a request to manage the telephony services from a requesting service subscriber;
   b) establishing a communication session with the end office switch with a terminal emulation format compatible with the end office switch in response to receiving the request;
   c) receiving from the end office switch an interactive list of telephony services available to the requesting service subscriber;
   d) sending for display at a subscriber terminal the interactive list of telephony services available to the requesting service subscriber;
   e) receiving a requested service change in the form of service change input made to the interactive list of telephony services by the requesting service subscriber;
   f) converting the service change input into the terminal emulation format to provide a converted service change input;
   g) transmitting the converted service change input to the end office switch, thereby to effect the requested service change;
   h) receiving a confirmation message that the requested service change has been effected;
   i) sending the confirmation message to the requesting service subscriber; and
   j) terminating the communication session with the end office switch after the requested service change has been effected and the confirmation message has been sent.

2. The method of claim 1, further comprising:
   sending a subscriber identification request for display at the subscriber terminal;
   receiving a response to the subscriber identification request including subscriber authentication data; and
   validating the subscriber authentication data.

3. The method of claim 2, wherein validating the subscriber authentication data further comprises:
   comparing the subscriber authentication data with a service profile for the requesting service subscriber; and
   if the subscriber authentication data matches at least a part of the service profile, enabling the requesting service subscriber to view and make service change requests to the service profile for the requesting service subscriber.

4. The method of claim 3, wherein the interactive list of telephony services is based, at least in part, on the service profile.

5. The method of claim 4, wherein the service profile for the requesting service subscriber includes privilege level information.

6. The method of claim 5, wherein the interactive list of telephony services is displayed on the subscriber terminal in a visual format.

7. The method of claim 6, wherein the interactive list of telephony services further comprises a hypertext markup language (HTML) compatible page.

8. The method of claim 7, wherein the service change input is converted into a Telnet-compatible format utilized by the end office switch.

9. A telephony service management system for controlling telephony services in an end office switch serving a plurality of service subscribers, comprising:
   a) a first interface disposed to communicate with a subscriber terminal;
   b) a second interface disposed to communicate with the end office switch;
   c) a control system, associated with the first interface and the second interface, adapted to:
      i) receive a request to manage the telephony services from a requesting service subscriber;
      ii) establish a communication session with the end office switch with a terminal emulation format compatible with the end office switch in response to receiving the request;
      iii) receive from the end office switch an interactive list of telephony services available to the requesting service subscriber;
      iv) send for display at the subscriber terminal the interactive list of telephony services available to the requesting service subscriber;
      v) receive a requested service change in the form of service change input made to the interactive list of telephony services by the requesting service subscriber;

vi) convert the service change input into the terminal emulation format to provide a converted service change input;
vii) transmit the converted service change input to the end office switch, thereby to effect the requested service change;
viii) receive a confirmation message that the requested service change has been effected;
ix) send the confirmation message to the requesting service subscriber; and
x) terminate the communication session with the end office switch after the requested service change has been effected and the confirmation message has been sent.

10. The telephony service management system of claim 9, wherein the control system is further adapted to:
send a subscriber identification request for display at the subscriber terminal;
receive a response to the subscriber identification request including subscriber authentication data; and
validate the subscriber authentication data.

11. The telephony service management system of claim 10, wherein validating the subscriber authentication data further comprises:
comparing the subscriber authentication data with a service profile for the requesting service subscriber; and
if the subscriber authentication data matches at least a part of the service profile, permit the requesting service subscriber to view and make service change requests to the service profile for the requesting service subscriber.

12. The telephony service management system of claim 11, wherein the interactive list of telephony services is based, at least in part, on the service profile.

13. The telephony service management system of claim 12, wherein the service profile for the requesting service subscriber includes privilege level information.

14. The telephony service management system of claim 13, wherein the subscriber terminal is connected to a public access data network.

15. The telephony service management system of claim 14, wherein the interactive list of telephony services is displayed on the subscriber terminal in a visual format.

16. The telephony service management system of claim 15, wherein the interactive list of telephony services further comprises a hypertext markup language (HTML) compatible page.

17. The telephony service management system of claim 16, wherein the service change input is converted into a Telnet-compatible format utilized by the end office switch.

* * * * *